United States Patent [19]

Portnoy et al.

[11] 4,108,748

[45] Aug. 22, 1978

[54] PHOTOFINISHING OF COTTON TEXTILES

[75] Inventors: Norman A. Portnoy, Hopatcong, N.J.; Jett C. Arthur, Jr.; Matthew F. Margavio, both of Metairie, La.; Marie C. Nelson, New Orleans, La.

[73] Assignee: The United States of America as represented by the Secretary of Agriculture, Washington, D.C.

[21] Appl. No.: 563,257

[22] Filed: Mar. 28, 1975

[51] Int. Cl.$^2$ .............................. C08L 1/08; B01J 1/10
[52] U.S. Cl. .......................... 204/159.12; 8/DIG. 12; 204/160.1
[58] Field of Search ........................ 204/159.12, 160.1; 8/120, DIG. 12

[56] References Cited

U.S. PATENT DOCUMENTS

| 2,998,329 | 8/1961 | Sovish et al. ..................... 204/159.12 |
| 3,325,385 | 6/1967 | Keene et al. ..................... 204/159.12 |
| 3,669,916 | 6/1972 | Nakao et al. ................. 260/17.4 GC |
| 3,677,692 | 6/1972 | Arthur et al. ............................. 8/120 |
| 3,709,658 | 1/1973 | Walsh et al. ............................. 8/129 |
| 3,899,289 | 8/1975 | Berni et al. ............................. 8/120 |
| 3,926,549 | 12/1975 | Mares et al. ......................... 8/116 R |
| 3,926,550 | 12/1975 | Harris et al. ........................ 8/116 R |
| 3,926,555 | 12/1975 | Reine et al. ............................ 8/189 |

OTHER PUBLICATIONS

Walsh, W. K. and Rutherford, H. A., "Delayed Cure with Ionizing Radiation", Textile Research Journal 37, 89-93 (1967).

Sumrell et al., *The Acrylation, Methacrylation and Acrylamidomethylation of Cellulose*, Textile Research Journal, 78-85 (1969; Jan.).

Geacintov et al., Die Makromolekulare Chemie, vol. 36, pp. 52-66, (1960).

*Primary Examiner*—Murray Tillman
*Assistant Examiner*—Thurman K. Page
*Attorney, Agent, or Firm*—M. Howard Silverstein; David G. McConnell; Salvador J. Cangemi

[57] ABSTRACT

Acrylated cotton fabric is reacted with water-N,N-dimethylformamide solutions of acrylamide and then exposed to near ultraviolet light in an inert atmosphere to produce crosslinked acrylated cotton fabrics with durable press properties. The treatment is also applicable to methacrylated cotton fabric and the results obtained are similar.

4 Claims, No Drawings

PHOTOFINISHING OF COTTON TEXTILES

This invention relates to chemical processing of cotton textiles. Specifically, this invention relates to the wet-processing of cotton fabric which has been previously chemically modified. More specifically, this invention relates to a multistep wet processing of acrylated and methacrylated cotton fabric subjecting the reacted fabric to a near ultraviolet light treatment, a photofinishing step, to form a crosslinked cotton fabric with useful durable-press properties.

The main object of this invention is to provide a new textile wet-process method.

A second object of this invention is to provide a chemical treatment for further enhancing the physical properties of acrylated and methacrylated cotton without using a heat cure.

A third object of this invention is to provide a photofinishing process for initiating crosslinking reactions of acrylated and methacrylated cottons to yield textile fabrics with durable-press properties.

BACKGROUND AND PRIOR ART

Developments in the commercial use of durable-press textiles have generally led to the use of blends of cotton fibers and man-made chemical fibers in order to have products with high wrinkle recovery angles and easy care properties. When all-cotton fabrics are finished by normally used processes chemical reagents are padded onto the fabrics; then they are cured by chemical catalyst and baking at a high temperature in an air oven. Usually, there is no reaction control, that is, directed selectivity of the reactions, in these processes. All-cotton products treated in this manner may have increased wrinkle recovery angles, but drastic and prohibitive losses in tearing and breaking strengths of the fabrics may occur during the curing steps. Similarly, a combination of chemical catalyst and baking at high temperature in one step and subsequent use of high energy radiation in a second step has been proposed for preparation of durable-press cotton products. These types of processes usually compound the drastic and prohibitive losses in breaking strengths of the cotton fabrics, first in the chemical catalyst-heat curing step and second in the high energy radiation step. Also, there is little or no reaction control, that is, directed selectivity of the reactions, in these processes.

THE PRESENT INVENTION

By the process of the present invention the macromolecular properties of cotton are stabilized and the morphological properties of cotton are imparted a retention and recovery of initial shape and form after deformation, so that durable-press cotton fabric with high wrinkle recovery angles are produced. The method of this invention has as its objective the modification of the chemical structure of cotton fibers, mechanically organized into textile products and then the photofinishing of the modified products to yield an all-cotton, durable-press textile with high wrinkle recovery angles and easy care properties.

The instant invention defines a distinct improvement in the textile, durable-press properties of all-cotton fabrics in which acrylate and methacrylate chemical derivatives of cotton cellulose fabrics are prepared and then photolyzed by near ultraviolet light to yield crosslinked, durable-press cotton fabrics with improved wrinkle recovery angles with minimum losses in breaking strengths of the chemically modified cotton fabrics. Cotton cellulose fabrics that had been chemically modified by reaction with acryloyl chloride or methacryloyl chloride to degrees of substitution ranging from 0.08 to 0.50 were padded with N,N-dimethylformamide, water, combinations of these two solvents ranging from 10 to 100 percent N,N-dimethylformamide and 10 to 100 percent water, or solutions of these solvents containing acrylamide ranging from 0.5 to 4 percent and then photolyzed for 30 minutes to 22 hours in nitrogen or air atmospheres at ambient temperature, about 48° C, by near ultraviolet light with a wavelength maximum of 3500 angstroms, which had been shown to yield a maximum concentration of cellulosic radicals with minimum degradative damage to the physical properties of cotton, to yield cotton fabrics with Monsanto wrinkle recovery angles (American Society for Testing and Materials, Philadelphia, Pa., test method ASTM Designation D1295-60T) as high as 331° (wet) and 285° (conditioned), as compared with wrinkle recovery angles of control fabrics of 174° (wet) and 160° (conditioned).

Samples of cotton fabric used were a commercial grey printcloth (about 3.2 ounces per square yard, 80 × 80 thread count) which had been enzymatically desized, alkali scoured, and peroxide bleached before use. Typically, two or three strips of cotton fabric about 5 to 7.5 parts, were rolled together and placed together in a container fitted with a drying tube. Calcium carbonate (about 6 parts), N,N-dimethylformamide (about 60 parts), and acryloyl chloride or methacryloyl chloride (3 to 10 parts) were added to the container. The container and its contents were heated typically in an oil bath at 100° to 110° C for the time required to give the cotton cellulose ester with the desired degree of substitution. After cooling the samples to about 25° C, they were washed in water and air-dried either in a slack condition or under tension on pin frames.

SUMMARY OF THE INVENTION

The present invention can best be described as the acrylated and the methacrylated cotton products and processes for making these, the processes of which can be that embodiment for imparting to cotton fabrics the desirable durable press property of wrinkle recovery while retaining the natural properties of untreated cotton, and comprising:

(a) impregnating either the acrylated cotton fabric or the methacrylated cotton fabric of a degree of substitution of about from 0.08 to 0.5, with a 0.5 to 4.0% acrylamide solution in a solvent mixture of water and N,N-dimethylformamide wherein the water content can vary from 10 to 100%, and vice versa, (b) subjecting the wet impregnated acrylated or methacrylated cotton fabric to a photolyzing treatment consisting of exposing the impregnated fabric to near ultraviolet light (ordinarily in the range of about from 3100 to 4000 Angstrom units of intensity, the maximum intensity generally peaking at about 3500 Angstroms) for about from 30 minutes to 22 hours, in an inert atmosphere, generally nitrogen, to initiate a free radical crosslinking reaction between substituted acrylate groups or methacrylate groups on cotton as well as substituted acrylate or methacrylate groups and cotton to obtain a crosslinked, durable-press fabric, which is generally washed and dried before fabrication of a garment or other finished product.

The following samples are provided to facilitate the comprehension of this invention and should not be construed as limiting the invention in any manner whatever.

EXAMPLES

Seventy-three samples were prepared for a comprehensive study of the effects observed when practicing this invention. Samples of the acrylated or methacrylated cotton fabrics were impregnated with solvents or solutions, as indicated by padding to a wet add-on of about 180 percent. These treated samples were placed in a container in the desired atmosphere and exposed to near ultraviolet light which had about 90 percent of the intensity of the light with a wavelength of about 3500 Angstrom units, at ambient temperatures for certain specific times, ranging about from 30 minutes to 22 hours, in a nitrogen atmosphere. Typically, the breaking strengths of samples (American Society for Testing and Materials, Philadelphia, Pa., test method ASTM Designation D-1682-64) before and after photolysis for one hour were as follows: acrylated cotton fabric, degree of substitution 0.28, 25 pounds (before) and 21 pounds (after); methacrylated cotton fabric, degree of substitution 0.15, 25 pounds (before) and 24 pounds (after).

Effects of Degree of Substitution, Solvent, and Time of Photolysis on the Wrinkle Recovery Angles of Acrylated and Methacrylated Cotton Fabrics

| Ex. | Degree of substitution | Solvent[a] | Time of photolysis,[b] min | Wrinkle recovery angle (W+F), degrees | |
|---|---|---|---|---|---|
| | | | | Wet | Conditioned |
| Control cotton fabric | | | | | |
| 1 | 0.00 | DMF | 0 | 174 | 160 |
| 2 | 0.00 | DMF | 60 | 182 | 165 |
| Acrylated cotton fabric | | | | | |
| 3 | 0.08 | DMF | 0 | 171 | 168 |
| 4 | 0.08 | DMF | 60 | 236 | 177 |
| 5 | 0.12 | DMF | 0 | 160 | 175 |
| 6 | 0.12 | DMF | 60 | 250 | 190 |
| 7 | 0.16 | DMF | 0 | 190 | 184 |
| 8 | 0.16 | DMF | 60 | 277 | 223 |
| 9 | 0.29 | DMF | 0 | 181 | 184 |
| 10 | 0.29 | DMF | 60 | 285 | 217 |
| 11 | 0.35 | DMF | 0 | 189 | 203 |
| 12 | 0.35 | DMF | 30 | 260 | 207 |
| 13 | 0.35 | DMF | 60 | 292 | 229 |
| 14 | 0.35 | DMF | 120 | 285 | 219 |
| 15 | 0.50 | DMF | 0 | 181 | 201 |
| 16 | 0.50 | DMF | 60 | 296 | 225 |
| 17 | 0.16 | 10% aq. DMF | 0 | 190 | 184 |
| 18 | 0.16 | 10% aq. DMF | 60 | 277 | 214 |
| 19 | 0.16 | 33% aq. DMF | 0 | 190 | 184 |
| 20 | 0.16 | 33% aq. DMF | 60 | 283 | 214 |
| 21 | 0.41 | 10% aq. DMF | 0 | 185 | 179 |
| 22 | 0.41 | 10% aq. DMF | 30 | 261 | 222 |
| 23 | 0.41 | 10% aq. DMF | 60 | 281 | 227 |
| 24 | 0.41 | 10% aq. DMF | 120 | 303 | 219 |
| 25 | 0.50 | 33% aq. DMF | 0 | 181 | 201 |
| 26 | 0.50 | 33% aq. DMF | 60 | 290 | 219 |
| 27 | 0.29 | water | 0 | 181 | 184 |
| 28 | 0.29 | water | 60 | 225 | 215 |
| 29 | 0.50 | water | 0 | 181 | 201 |
| 30 | 0.50 | water | 60 | 228 | 217 |
| Methacrylated cotton fabric | | | | | |
| 31 | 0.06 | DMF | 0 | 171 | 184 |
| 32 | 0.06 | DMF | 60 | 224 | 190 |
| 33 | 0.09 | DMF | 0 | 163 | 174 |
| 34 | 0.09 | DMF | 60 | 239 | 187 |
| 35 | 0.11 | DMF | 0 | 189 | 193 |
| 36 | 0.11 | DMF | 60 | 286 | 235 |
| 37 | 0.27 | DMF | 0 | 171 | 181 |
| 38 | 0.27 | DMF | 60 | 291 | 195 |
| 39 | 0.36 | DMF | 0 | 162 | 180 |
| 40 | 0.36 | DMF | 60 | 277 | 212 |
| 41 | 0.36 | DMF[c] | 0 | 162 | 180 |
| 42 | 0.36 | DMF[c] | 60 | 177 | 181 |
| 43 | 0.09 | 10% aq. DMF | 0 | 163 | 174 |
| 44 | 0.09 | 10% aq. DMF | 60 | 203 | 187 |
| 45 | 0.09 | 33% aq. DMF | 0 | 163 | 174 |
| 46 | 0.09 | 33% aq. DMF | 60 | 205 | 188 |
| 47 | 0.27 | 10% aq. DMF | 0 | 171 | 181 |
| 48 | 0.27 | 10% aq. DMF | 60 | 291 | 212 |
| 49 | 0.27 | 33% aq. DMF | 0 | 171 | 181 |
| 50 | 0.27 | 33% aq. DMF | 60 | 295 | 224 |
| 51 | 0.36 | 10% aq. DMF | 0 | 162 | 180 |
| 52 | 0.36 | 10% aq. DMF | 60 | 290 | 211 |

[a] DMF = N,N-dimethylformamide.
[b] Photolyzed in nitrogen atmosphere at 40° C by 3100–4000 A., peak 3500 A., light.
[c] Photolyzed in air.

Effects of Addition of Acrylamide to Solvent on the Wrinkle Recovery Angles of Photolyzed Acrylated Cotton Fabrics[a]

| Example | Solvent[b] | Monomer concentration, % | Wrinkle recovery angle (W+F), degrees | |
|---|---|---|---|---|
| | | | Wet | Conditioned |
| Degree of substitution: 0.17 | | | | |
| 53 | DMF | — | 279 | 218 |
| 54 | DMF | 2 | 268 | 202 |
| 55 | DMF | 4 | 300 | 178 |
| 56 | $H_2O$ | — | 221 | 186 |
| 57 | $H_2O$ | 2 | 292 | 218 |
| 58 | $H_2O$ | 4 | 310 | 220 |
| Degree of substitution: 0.28 | | | | |
| 59 | DMF | — | 285 | 217 |
| 60 | DMF | 2 | 311 | 217 |
| 61 | DMF | 4 | 302 | 213 |
| 62 | $H_2O$ | 1 | 279 | 234 |
| 63 | $H_2O$ | 2 | 290 | 246 |
| 64 | $H_2O$ | 4 | 291 | 217 |
| Degree of substitution: 0.41 | | | | |
| 65 | DMF | — | 306 | 218 |
| 66 | DMF | 2 | 299 | 206 |
| 67 | DMF | 4 | 313 | 198 |
| 68 | $H_2O$ | 0.5 | 289 | 260 |
| 69 | $H_2O$ | 1 | 297 | 261 |
| 70 | $H_2O$ | 1 | 301[c] | 248[c] |
| 71 | $H_2O$ | 1 | 331[d] | 285[d] |
| 72 | $H_2O$ | 2 | 299 | 264 |
| 73 | $H_2O$ | 4 | 308 | 257 |

[a] Samples of fabric padded to about 180% wet add-on; photolyzed at 40° C by 3100–4000 A., peak 3500 A., light for 1 hr.; then washed and air-dried.
[b] DMF = N,N-dimethylformamide.
[c] Photolyzed for 3 hr.
[d] Photolyzed for 22 hr.

By the method as described in the specification above, acrylated cotton printcloth fabrics (degrees of substitution 0.00, 0.08, 0.12, 0.16, 0.29, 0.35, 0.41, and 0.50) were padded with N,N-dimethylformamide, water, N,N-dimethylformamide (90%)—water (10%), or N,N-dimethylformamide (67%)—water (33%) were photolyzed for 60 minutes as shown in Examples 2, 4, 6, 8, 10, 13, 16, 18, 20, 23, 26, 28, and 30 and their wrinkle recovery angles were compared with those of unphotolyzed cotton fabrics as shown in Examples 1, 3, 5, 7, 9, 11, 15, 17, 19, 21, 25, 27, and 29. The wrinkle recovery angles (wet) of the acrylated fabrics photolyzed wet with N,N-dimethylformamide increased from 182° to 296° with increase in degrees of substitution from 0.00 to 0.50 as shown in Examples 1–11, 13, 15, 16. Acrylated fabric samples wet with water and photolyzed exhibited much lower increases in wrinkle recovery angles as shown in Examples 27–30. Acrylated samples wet with N,N-dimethylformamide (90%)—water (10%), as shown in Examples 17, 18, 21, and 23, or N,N-dimethylformamide (67%)—water (33%), as shown in Examples 19, 20, 25, and 26, and photolyzed showed increases in wrinkle recovery angles (wet) similar to those shown when acrylated fabrics were wet with N,N-dimethylformamide and photolyzed. The effects of time of photolysis on the wrinkle recovery angles of acrylated fabrics are shown in Examples 11–14 and 21–24 with times of photolysis ranging from 0 to 120 minutes. The major increases in wrinkle recovery angles of the fabrics had occurred after 60 minutes of photolysis.

By the method as described in the specification above, methacrylated cotton printcloth fabrics (degrees of substitution 0.00, 0.06, 0.09, 0.11, 0.27, and 0.36) were padded with N,N-dimethylformamide, N,N-dimethylformamide (90%)—water (10%), or N,N-dimethylformamide (67%)—water (33%) were photolyzed for 60 minutes as shown in Examples 2, 32, 34, 36, 38, 40, 44, 46, 48, 50, and 52 and their wrinkle recovery angles were compared with those of unphotolyzed cotton fabrics as shown in Examples 1, 31, 33, 35, 37, 39, 43, 45, 47, 49, and 51. The wrinkle recovery angles (wet) of the methacrylated fabrics photolyzed wet with N,N-dimethylformamide increased from 182° to 291° with increase in degrees of substitution from 0.00 to 0.36 as shown in Examples 1, 2, and 31–40. Photolyzed methacrylated samples (degrees of substitution 0.09 to 0.36 wet with N,N-dimethylformamide (90%)—water (10%), as shown in Examples 43, 44, 47, 48, 51, and 52, had wrinkle recovery angles (wet) of 203° to 291°. Photolyzed methacrylated samples (degrees of substitution 0.09 to 0.27) wet with N,N-dimethylformamide (67%)—water (33%), as shown in Examples 45, 46, 49, and 50, had wrinkle recovery angles (wet) of 205° to 295°.

When the method as described in the specification above was changed so that the esterified fabrics were photolyzed in air rather than in nitrogen, increased in wrinkle recovery angles of the photolyzed, esterified fabrics over those of unphotolyzed fabrics were not obtained, as shown in Examples 41 and 42.

By the method as described in the specification above, acrylated cotton printcloth fabrics (degrees of substitution 0.17, 0.28, and 0.41) were padded with N,N-dimethylformamide containing 0 to 4 percent acrylamide or with water containing 0 to 4 percent acrylamide and were photolyzed for 1 to 22 hours, as shown in Examples 53–73. Photolyzed acrylated fabrics wet with water and acrylamide had higher wrinkle recovery angles than photolyzed acrylated fabrics wet with water alone; or with N,N-dimethylformamide and acrylamide. Compare Examples 53–55, 56–58, 59–61, 62–64, 65–67, 68, 69, 72, and 73 with Examples 27–30, respectively. Acrylated fabrics, degree of substitution 0.41, wet with water containing 0.5 to 4 percent acrylamide and photolyzed for 1 to 22 hours had wrinkle recovery angles (wet) as high as 331° and wrinkle recovery angles (conditioned) as high as 285°, as shown in Examples 68–73.

We claim:

1. A process for imparting to cotton fabrics the desirable durable-press property of wrinkle recovery while retaining the natural properties of untreated cotton, the process comprising:
    (a) impregnating an acrylated cotton fabric of about from 0.08 to 0.5 degree of substitution with a 0.5 to 4.0% acrylamide solution in a solvent mixture of water and N,N-dimethylformamide wherein the water content or the N,N-dimethylformamide content can vary from 10 to 100%,
    (b) subjecting the wet impregnated acrylated cotton fabric of (a) to a photolyzing treatment consisting of exposing the impregnated fabric to near ultraviolet light of 3100 to 4000 Angstrom units, with maximum intensity of about 3500 Angstrom units, for about from 30 minutes to 22 hours, in an inert atmosphere to initiate a free-radical crosslinking reaction between substituted acrylate groups on cotton as well as substituted acrylate groups and cotton to obtain a crosslinked, durable-press fabric, and
    (c) washing and drying the photolyzed acrylated and crosslinked fabric.

2. The photolyzed acrylated and crosslinked fabric produced by the process of claim 1.

3. A process for imparting to cotton fabrics the desirable durable-press property of wrinkle recovery while retaining the natural properties of untreated cotton, the process comprising:
    (a) impregnating a methacrylated cotton fabric of about from 0.06 to 0.36 degree of substitution in a solvent mixture of water and N,N-dimethylformamide wherein the water content or the N,N-dimethylformamide content can vary from 10 to 100%,
    (b) subjecting the wet impregnated methacrylated cotton fabric of (a) to a photolyzing treatment consisting of exposing the impregnated fabric to near ultraviolet light of 3100 to 4000 Angstrom units, with maximum intensity of about 3500 Angstrom units, for about 60 minutes, in an inert atmostphere to initiate a free-radical crosslinking reaction between substituted methacrylate groups on cotton as well as substituted methacrylate groups and cotton to obtain a crosslinked, durable-press fabric, and
    (c) washing and drying the photolyzed methacrylated and crosslinked fabric.

4. The photolyzed methacrylated and crosslinked fabric produced by the process of claim 3.

* * * * *